US012784030B2

(12) United States Patent
Sharma et al.

(10) Patent No.: US 12,784,030 B2
(45) Date of Patent: Nov. 3, 2026

(54) PROVISIONING OF PAYMENT ACCEPTANCE TO PAYMENT ACCOUNT HOLDERS

(71) Applicant: MasterCard International Incorporated, Purchase, NY (US)

(72) Inventors: Prashant Sharma, Madison, NJ (US); Zahir Khoja, Larchmont, NY (US); James Hicks, Toronto (CA); Ashwin Chandrasekaran, Edgewater, NJ (US); Philip Wei Ping Yen, Singapore (SG)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/479,367

(22) Filed: Oct. 2, 2023

(65) Prior Publication Data

US 2024/0029053 A1 Jan. 25, 2024

Related U.S. Application Data

(62) Division of application No. 16/251,477, filed on Jan. 18, 2019, now Pat. No. 11,803,839.

(60) Provisional application No. 62/620,249, filed on Jan. 22, 2018.

(51) Int. Cl.

*G06Q 20/36* (2012.01)
*G06Q 20/34* (2012.01)

(52) U.S. Cl.

CPC ......... *G06Q 20/363* (2013.01); *G06Q 20/347* (2013.01); *G06Q 20/3558* (2013.01)

(58) Field of Classification Search

None

See application file for complete search history.

(56) References Cited

U.S. PATENT DOCUMENTS 9,292,870 B2 * 3/2016 Langley ............ G06Q 20/3278
2004/0054632 A1 3/2004 Remy (Continued)

FOREIGN PATENT DOCUMENTS

WO 2017/116620 A1 7/2017

OTHER PUBLICATIONS

PTO-892 Form dated Jun. 24, 2020 which was received in connection with U.S. Appl. No. 16/251,477.

(Continued)

*Primary Examiner* — Divesh Patel

(74) *Attorney, Agent, or Firm* — Buckley, Maschoff & Talwalkar LLC

(57) ABSTRACT

A method includes receiving a request for enrollment from a user at a wallet service provider (WSP) computer, and enrolling the user in the WSP computer. A message is transmitted to the user to query the user about accepting payment card account system transactions. A response to the message, from the user, is received in the WSP computer. The WSP computer downloads, to a device operated by the user, a list of acquirer financial institutions. The WSP computer receives, from the device operated by the user, an indication that the user has selected one of the acquirer financial institutions from the list. An application program supplied by the selected acquirer financial institution is downloaded to the device operated by the user.

10 Claims, 8 Drawing Sheets

(56) References Cited

U.S. PATENT DOCUMENTS

| | | | | |
|---|---|---|---|---|
| 2007/0255652 | A1* | 11/2007 | Tumminaro | G06Q 20/3229 455/466 |
| 2008/0208742 | A1 | 8/2008 | Arthur et al. | |
| 2010/0100480 | A1 | 4/2010 | Altman et al. | |
| 2012/0079581 | A1 | 3/2012 | Patterson | |
| 2012/0173422 | A1 | 7/2012 | Hu | |
| 2012/0253852 | A1 | 10/2012 | Pourfallah et al. | |
| 2012/0317032 | A1* | 12/2012 | Wilkes | G06Q 20/10 705/44 |
| 2013/0226722 | A1 | 8/2013 | Barrera et al. | |
| 2014/0040001 | A1* | 2/2014 | Harvey | G06Q 30/0222 705/41 |
| 2014/0046788 | A1* | 2/2014 | Lee | G06Q 20/3276 705/21 |
| 2014/0164154 | A1 | 6/2014 | Ramaci | |
| 2014/0172680 | A1* | 6/2014 | Prabhu | G06Q 40/03 705/38 |
| 2014/0249999 | A1 | 9/2014 | Johnson et al. | |
| 2015/0032588 | A1 | 1/2015 | Skoff, II | |
| 2015/0052064 | A1 | 2/2015 | Karpenko et al. | |
| 2015/0248664 | A1* | 9/2015 | Makhdumi | G06Q 20/3274 235/380 |
| 2015/0254639 | A1 | 9/2015 | Radu | |
| 2016/0048814 | A1 | 2/2016 | Wagner | |
| 2016/0098699 | A1 | 4/2016 | Pandey | |
| 2016/0232525 | A1 | 8/2016 | Cateland | |
| 2016/0314640 | A1 | 10/2016 | Ward et al. | |
| 2017/0091860 | A1 | 3/2017 | Srivastava et al. | |
| 2017/0178124 | A1* | 6/2017 | Havilio | G06Q 20/382 |
| 2017/0193497 | A1 | 7/2017 | Macedo et al. | |
| 2019/0220839 | A1 | 7/2019 | Oliynyk | |

OTHER PUBLICATIONS

PTO-892 Form dated Dec. 22, 2020 which was received in connection with U.S. Appl. No. 16/251,477.

PTO-892 Form dated Jun. 14, 2021 which was received in connection with U.S. Appl. No. 16/251,477.

PTO-892 Form dated Jan. 4, 2022 which was received in connection with U.S. Appl. No. 16/251,477.

PTO-892 Form dated Apr. 26, 2022 which was received in connection with U.S. Appl. No. 16/251,477.

PTO-892 Form dated Nov. 4, 2022 which was received in connection with U.S. Appl. No. 16/251,477.

PTO-892 Form dated Jun. 27, 2023 which was received in connection with U.S. Appl. No. 16/251,477.

Notice of Allowance dated Jun. 27, 2023 which was received in connection with U.S. Appl. No. 16/251,477.

Information Disclosure Statement dated Aug. 12, 2019 which was filed in U.S. Appl. No. 16/251,477.

Information Disclosure Statement dated Sep. 21, 2021 which was filed in U.S. Appl. No. 16/251,477.

European Extended Search Report for U.S. Appl. No. 16/251,477-1213 / 3743869, PCT/US2019/013566 mailed Sep. 21, 2021, 9pp, which was filed U.S. Appl. No. 16/251,477.

PCT International Search Report and Written Opinion for Application No. PCT/US2019/013566 mailed May 23, 2019, 8 pp, which was filed U.S. Appl. No. 16/251,477.

* cited by examiner

PROVISIONING OF PAYMENT ACCEPTANCE TO PAYMENT ACCOUNT HOLDERS

CROSS REFERENCE TO RELATED APPLICATION

The present application is a Divisional of co-pending U.S. patent application Ser. No. 16/251,477 entitled "PROVISIONING OF PAYMENT ACCEPTANCE TO PAYMENT ACCOUNT HOLDERS" and filed Jan. 18, 2019, which claims the benefit of U.S. Provisional Patent Application No. 62/620,249 (filed on Jan. 22, 2018). The entire contents of these applications are hereby incorporated by reference for all purposes.

BACKGROUND

FIG. 1 is a block diagram that illustrates a payment card account system 100.

The system 100 includes a customer device 102 such as a magnetic stripe card, a payment IC (integrated circuit) card (contactless and/or contact), or a payment-enabled mobile device. Block 104 in FIG. 1 represents a merchant device such as a POS (point of sale) terminal/card reader. The merchant device 104 may also be considered part of the payment card account system 100. The customer device 102 may be presented to the merchant device 104, to consummate a purchase transaction and to permit the merchant device 104 to read payment card account data (including, e.g., a payment account number) from the customer device 102. In other situations, the merchant device 104 may be an e-commerce server computer, and the customer device 102 may be a personal computer, a mobile device running a mobile browser, etc.; in such situations, the customer device 102 may engage in an online shopping session with an e-commerce website hosted by the merchant device 104.

A computer 106 operated by an acquirer (acquiring financial institution) is also shown as part of the system 100 in FIG. 1. The acquirer computer 106 may receive a payment account system authorization request message for the transaction from the merchant device 104. The acquirer computer 106 may route the authorization request message via a payment card network 108 to a server computer 110 operated by the issuer of a payment account that is associated with the account number obtained by the merchant device 104 (e.g., from the customer device 102) and included in the authorization request message. The authorization response message generated by the payment issuer server computer 110 may be routed back to the merchant device 104 via the payment card network 108 and the acquirer computer 106.

As is well known, the merchant is said to "accept" payment transactions in the payment card account system 100. The merchant's ability to perform transaction acceptance is enabled by the merchant's relationship with the acquirer or with a payment facilitator and is facilitated by the merchant's use of suitable POS equipment or the like (or an e-commerce server computer) to generate transaction data and to receive payment account information from the customer device 102.

One well known example of a payment card network is the one operated by Mastercard International Incorporated, which is the assignee hereof.

The payment account issuer server computer 110 may be operated by or on behalf of a financial institution ("FI") that issues payment accounts to individual users such as the customer who presented or operated the customer device 102 referred to above. For example, the payment card issuer server computer 110 may perform such functions as (a) receiving and responding to requests for authorization of payment account transactions to be charged to payment accounts issued by the FI; and (b) tracking and storing transactions and maintaining account records.

In some situations, as is well known to those who are skilled in the art, payment account system transactions may be facilitated by an entity known as a wallet service provider (WSP; not shown in FIG. 1). Typically, prior to engaging in future transactions, the customer/user may have enrolled to receive services from the WSP. In doing so, the user opens a wallet account with the WSP (to be stored in a server computer—not shown in FIG. 1—operated by the WSP). In connection with the opening of the wallet account, or thereafter, the user adds the payment account number and related information for one or more of his/her payment accounts into the wallet account stored for the user by the WSP. In performing a transaction thereafter, the user may employ a wallet app (application program for a mobile device) or may otherwise invoke the assistance of the WSP to select one of the user's payment accounts for use in the current transaction. The WSP may then provide the relevant payment account information to the merchant for inclusion in the transaction authorization request message to be generated for the transaction by the merchant.

The components of the system 100 as depicted in FIG. 1 are only those that are needed for processing a single transaction. A typical payment system may process many purchase transactions (including simultaneous transactions) and may include a considerable number of payment account issuers and their computers, a considerable number of acquirers and their computers, and numerous merchants and their devices, as well as a very large number of customer devices.

The present inventors have now recognized that there is an opportunity to provide to payment account holders, in a convenient manner, the capacity to accept payment account system transactions.

BRIEF DESCRIPTION OF THE DRAWINGS

Features and advantages of some embodiments of the present disclosure, and the manner in which the same are accomplished, will become more readily apparent upon consideration of the following detailed description of the invention taken in conjunction with the accompanying drawings, which illustrate preferred and example embodiments and which are not necessarily drawn to scale, wherein.

DESCRIPTION

In general, and for the purpose of introducing concepts of embodiments of the present disclosure, a user enrolls with a WSP to become a user of services provided by the WSP. As part of the enrollment process, the WSP offers to the user functionality to allow the user to start accepting payments in a payment account system. A relationship is established between the user and an acquirer, or with a payment facilitator, and a suitable app is downloaded to the user's device to permit the device to accept payment transactions from other devices.

Figure 2:
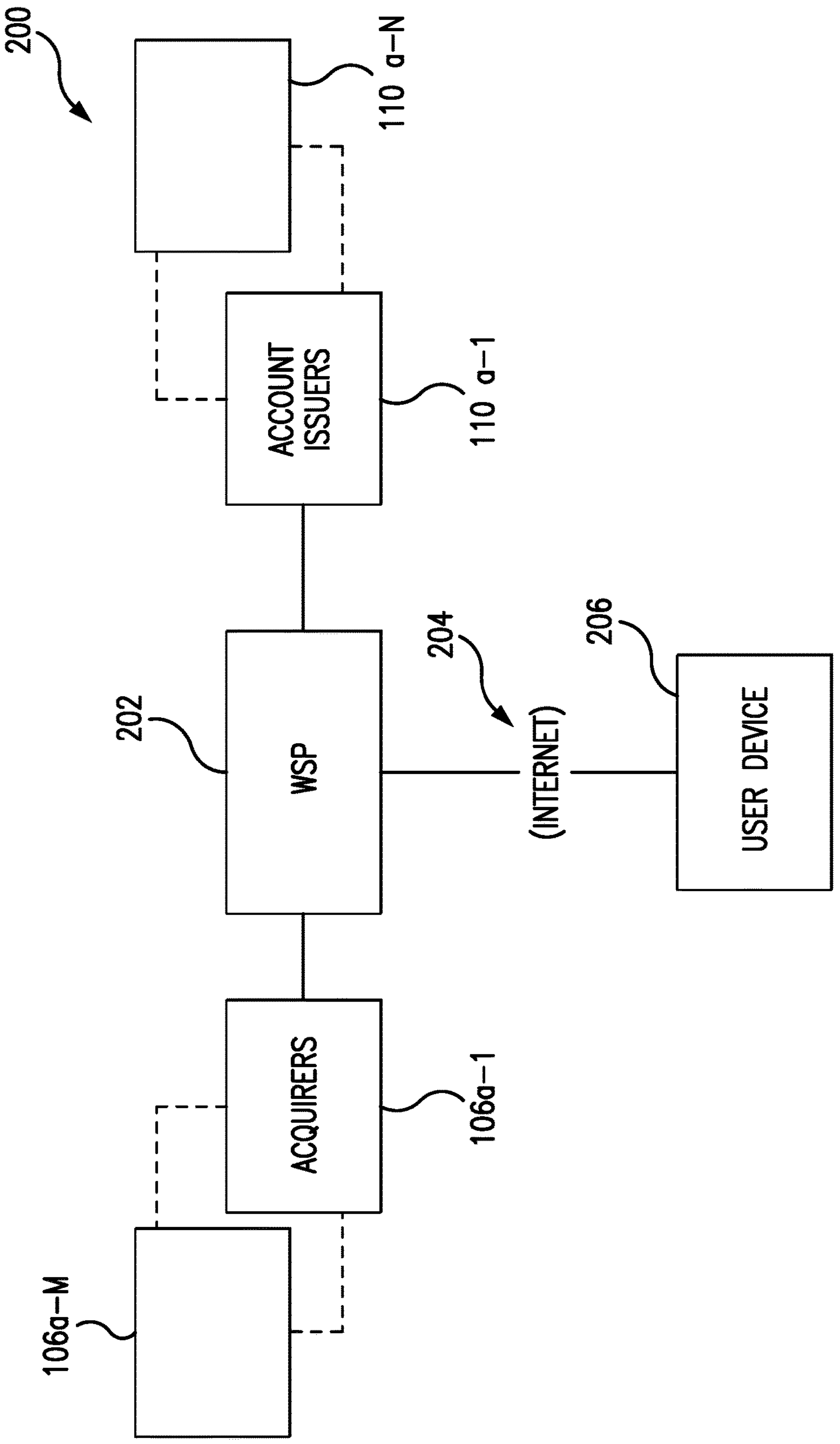
FIG. 2 is block diagram showing aspects of a payment system according to some embodiments.

FIG. 2 is block diagram showing aspects of a payment system 200, as provided according to some embodiments.

The system 200 includes a WSP computer 202. The WSP computer 202 may be operated by a WSP and may provide functionality as described below. Details of the WSP computer 202 will be provided in the ensuing discussion of FIG. 3. The WSP computer 202 is shown in data communication, via the internet 204, with a user device 206. The user device 206 may be, for example, a smartphone or other mobile computing device. Alternatively, the user device 206 may be another type of computing device, such as a desktop or laptop computer.

The WSP computer 202 is also in communication, at least from time to time, with at least some of a number of payment account issuer computers 110*a*-1 to 110*a*-N and a number of acquirer computers 106*a*-1 to 106*a*-M.

Figure 1:
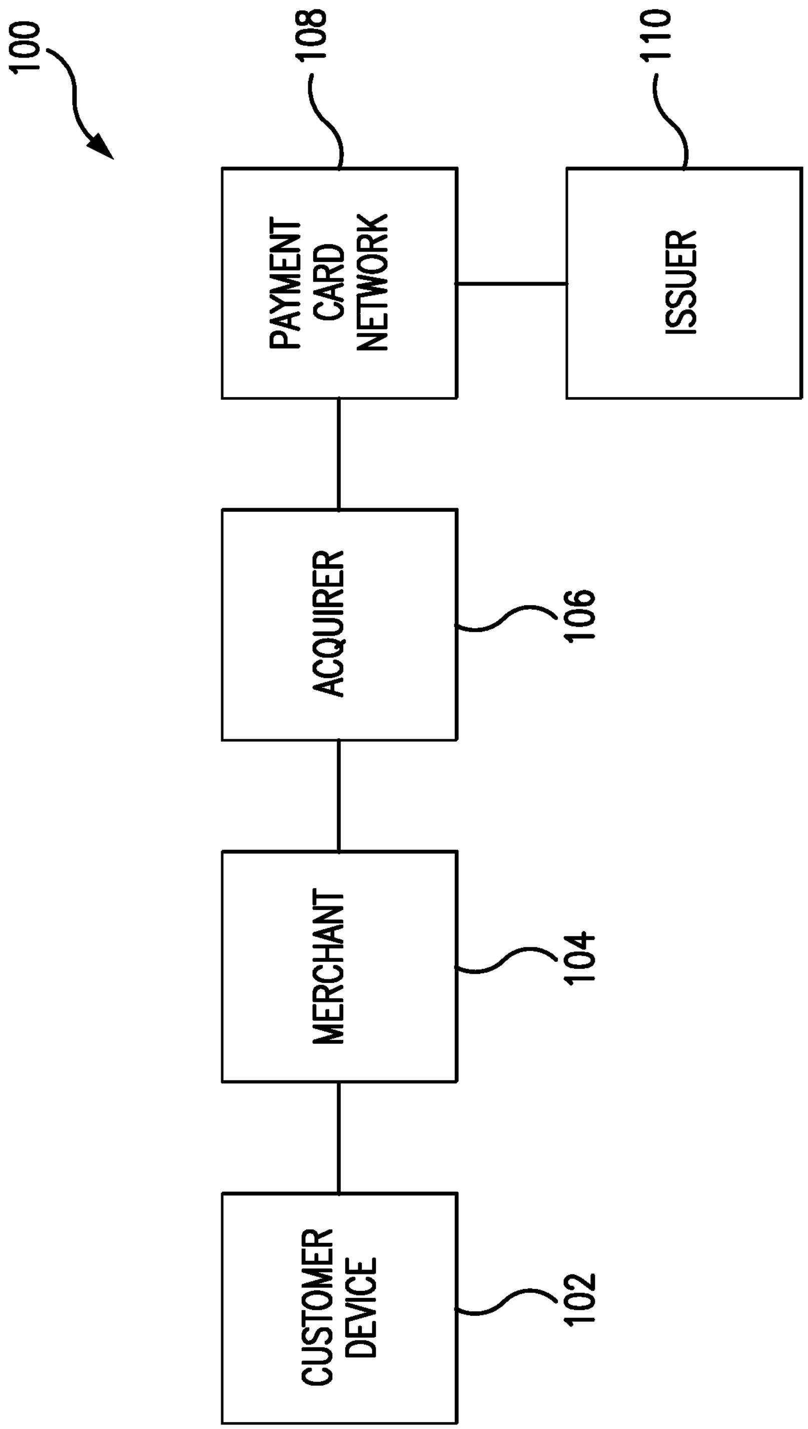
FIG. 1 is a block diagram of a payment card account system.

The system 200 may also include other components, which are not shown in FIG. 2, such as at least some or all of the components referred to in the above description of FIG. 1.

Figure 3:
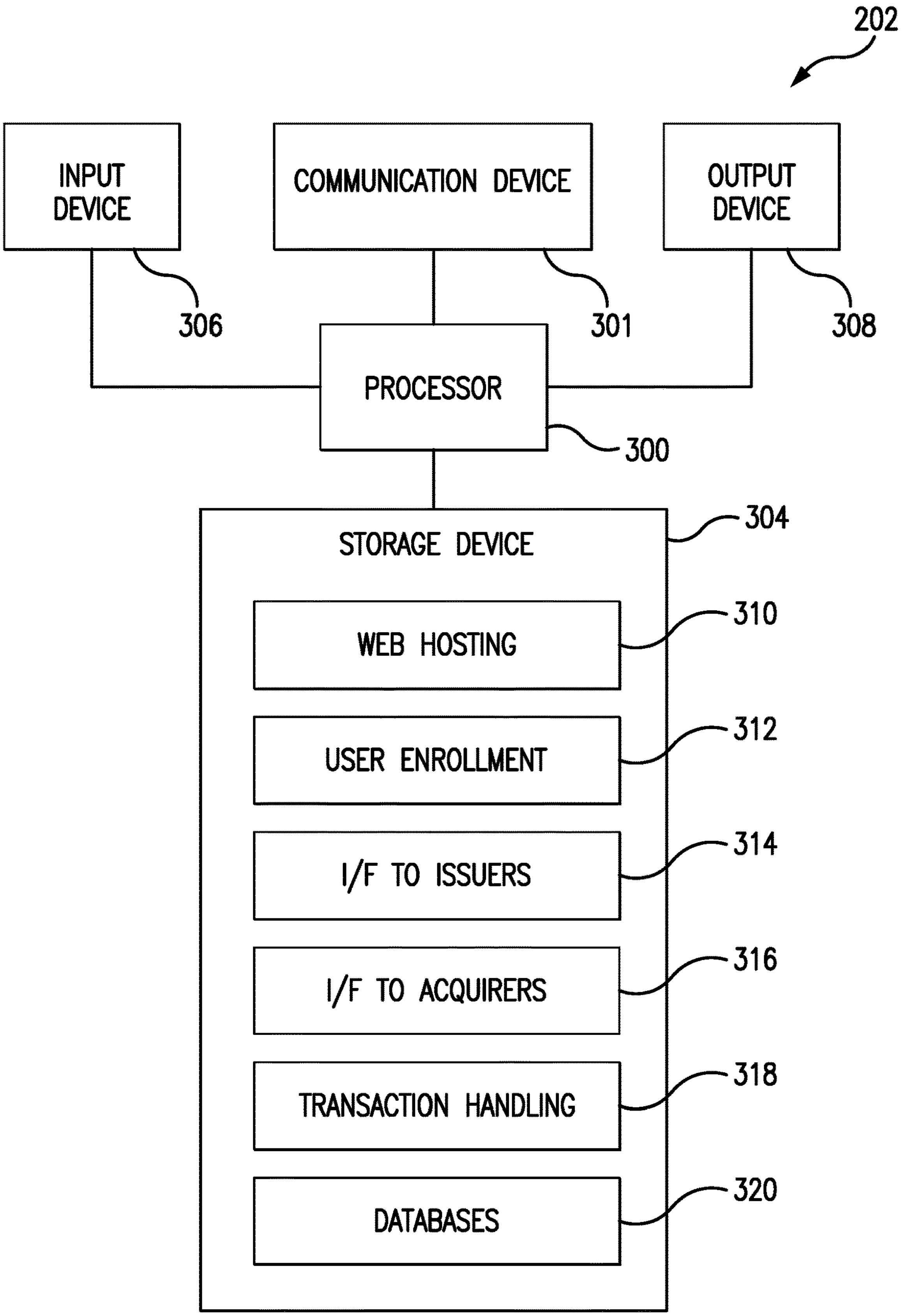
FIG. 3 is a block diagram of an example computer system that may perform functions in the system of FIG. 2.

FIG. 3 is a block diagram of an example embodiment of the WSP computer 202.

Referring now to FIG. 3, the WSP computer 202 may, in its hardware aspects, resemble a typical server computer and/or mainframe computer, but may be controlled by software to cause it to function as described herein.

The WSP computer 202 may include a computer processor 300 operatively coupled to a communication device 301, a storage device 304, an input device 306 and an output device 308. The communications device 301, the storage device 304, the input device 306 and the output device 308 may all be in communication with the processor 300.

The computer processor 300 may be constituted by one or more processors. Processor 300 operates to execute processor-executable steps, contained in program instructions described below, so as to control the WSP computer 202 to provide desired functionality.

Communication device 301 may be used to facilitate communication with, for example, other devices (such as other components of the system 200). Communication device 301 may comprise numerous communication ports (not separately shown), to allow the WSP computer 202 to communicate simultaneously with a number of other computers and other devices, including numerous user devices (only one shown in FIG. 2).

Continuing to refer to FIG. 3, input device 306 may comprise one or more of any type of peripheral device typically used to input data into a computer. For example, the input device 306 may include a keyboard and a mouse. Output device 308 may comprise, for example, a display and/or a printer.

Storage device 304 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 304 stores one or more programs for controlling processor 300. The programs comprise program instructions (which may be referred to as computer readable program code means) that contain processor-executable process steps of the WSP computer 202, executed by the processor 300 to cause the WSP computer 202 to function as described herein.

The programs may include one or more conventional operating systems (not shown) that control the processor 300 so as to manage and coordinate activities and sharing of resources in the WSP computer 202, and to serve as a host for application programs (described below) that run on the WSP computer 202.

The programs stored in the storage device 304 may include, for example, a web hosting application program 310. The web hosting application program 310 may operate to allow the WSP computer 202 to make a website available for access by user devices so that the user devices can interact with the WSP computer 202.

Another program that may be stored in the storage device 304 is an application program 312 for handling enrollment of new users for the WSP that operates the WSP computer 202. The enrollment application program 312 may provide functionality according to aspects of this disclosure, as discussed below in connection with FIGS. 4A and 4B.

Continuing to refer to FIG. 3, the storage device 304 may further store a software module (block 314) that serves as a software interface between the WSP computer 202 and the account issuer computers 110*a* shown in FIG. 2. In addition, the storage device 304 may store a software module 316 that serves as a software interface between the WSP computer 202 and the acquirer computers 106*a* shown in FIG. 2.

Still further, and continuing to refer to FIG. 3, the storage device 304 may store a transaction handling application program 318. The transaction handling application program 318 may program the processor 300 to enable the WSP computer 202 to perform its role in facilitating transactions requested by enrolled users of the WSP.

The storage device 304 may also store, and the WSP computer 202 may also execute, other programs, which are not shown. For example, such programs may include communications software and a reporting application. The latter program may respond to requests from system administrators for reports on the activities performed by the WSP computer 202. The other programs may also include, e.g., device drivers, database management software, etc.

The storage device 304 may also store one or more databases 320 needed for operation of the WSP computer 202.

Other computerized components of the system 200 may be constituted by computer hardware having the same type of components and hardware architecture as described herein with reference to FIG. 3. However, as noted above, the user device 206 may in many instances be a smartphone or other mobile computing device.

Figure 3A:
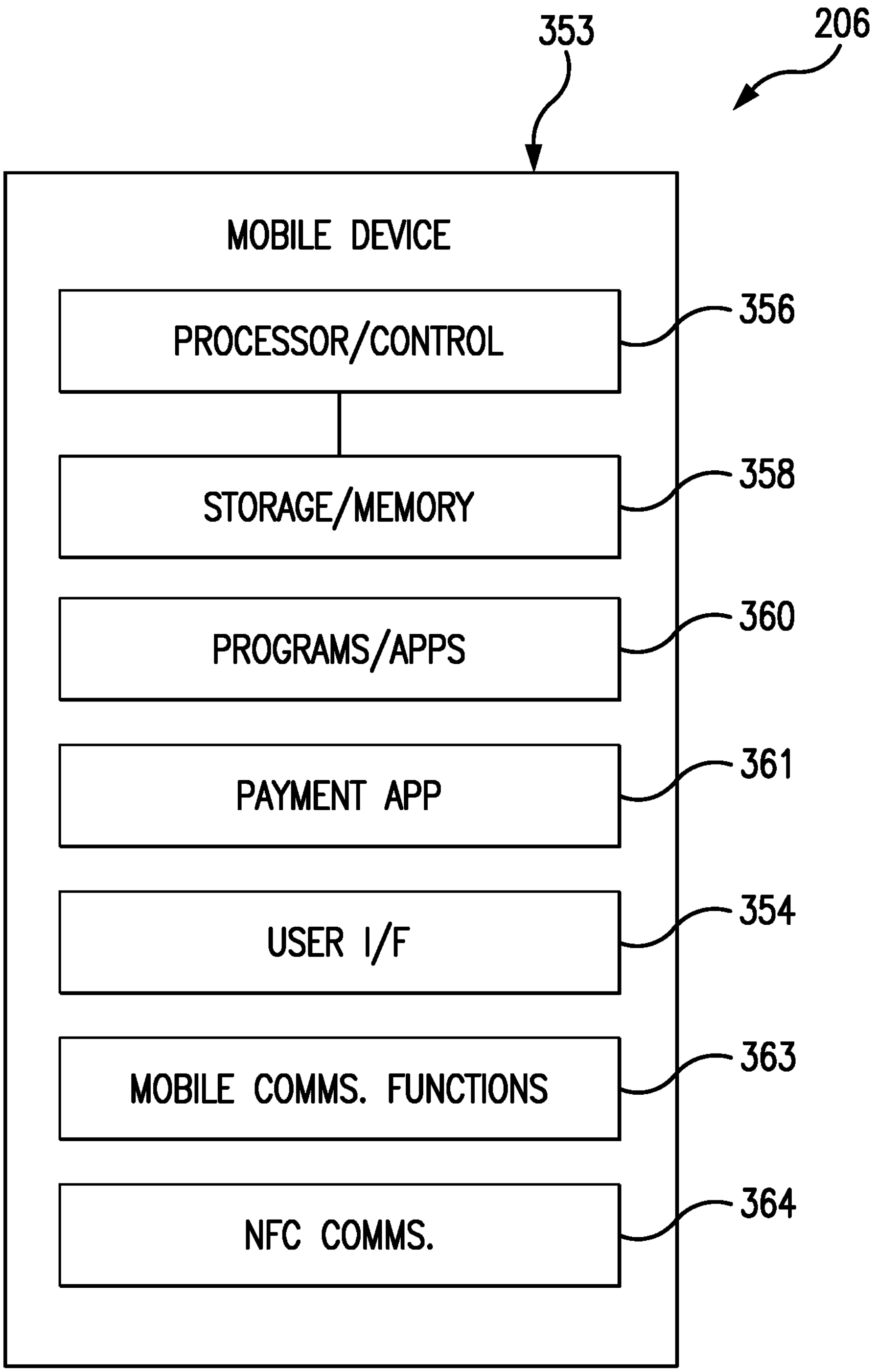
FIG. 3A is a block diagram of an example user device that may perform functions in the system of FIG. 2.

FIG. 3A is a block diagram of an example embodiment of the user device 206 shown in FIG. 2. The example embodiment shown in FIG. 3A is described with the assumption that a smartphone is employed as the user device 206.

Referring now to FIG. 3A, the user device 206 (according to this example) may include a housing 353. In many embodiments, the front of the housing 353 is predominantly constituted by a touchscreen (not separately shown), which is a key element of the user interface 354 of the user device 206.

The user device 206 further includes a mobile processor/control circuit 356, which is contained within the housing 353. Also included in the user device 206 is a storage/memory device or devices (reference numeral 358). The storage/memory devices 358 are in communication with the processor/control circuit 356 and may contain program instructions to control the processor/control circuit 356 to manage and perform various functions of the user device 206. As is well-known, a device such as user device 206 may function as what is in effect a pocket-sized personal computer (under the assumption that the user device 206 is embodied as a smartphone), via programming with a number of application programs, or "apps," as well as a mobile operating system (OS). (The apps are represented at block 360 in FIG. 3A, and may, along with other programs, in practice be stored in block 358, to program the processor/control circuit 356.) The apps 360 may include a mobile browser (not separately shown), which may be used to access websites, including a wallet service provider (WSP) website as described herein.

Also shown in FIG. 3A is a payment app 361. The payment app 361 is shown apart from the other apps represented at block 360, to indicate that in some embodiments the user device 206 may serve as a payment-enabled device, in addition to performing other functions, including those described in this disclosure.

As is typical for smartphones, the user device 206 may include mobile communications functions as represented by block 363. The mobile communications functions may include voice and data communications via a mobile communication network (not shown) with which the user device 206 is registered.

In addition, on the assumption that the user device 206 is equipped to function as a payment-enabled device, the user device 206 may include short-range radio communications capabilities (block 364), including for example NFC (near field communication). Thus block 364 may represent a suitable antenna (not separately shown) that is appropriate for NFC communications with a POS terminal reader component as well as driving and receiving circuitry associated with the antenna. It will be appreciated that the NFC antenna may be separate and different from the antenna (not separately shown) utilized by the user device 206 for the mobile communication functions represented by block 363.

From the foregoing discussion, it will be appreciated that the blocks depicted in FIG. 3A as components of the user device 206 may in effect overlap with each other, and/or there may be functional connections among the blocks which are not explicitly shown in the drawing. It may also be assumed that, like a typical smartphone, the user device 206 may include a rechargeable battery (not shown) that is contained within the housing 353 and that provides electrical power to the active components of the user device 206.

It has been posited that the user device 206 may be embodied as a smartphone, but this assumption is not intended to be limiting, as the user device 206 may alternatively, in at least some cases, be constituted by a tablet computer, a smartwatch or by other types of portable electronic devices, or by another type of computing device.

Figure 4A:
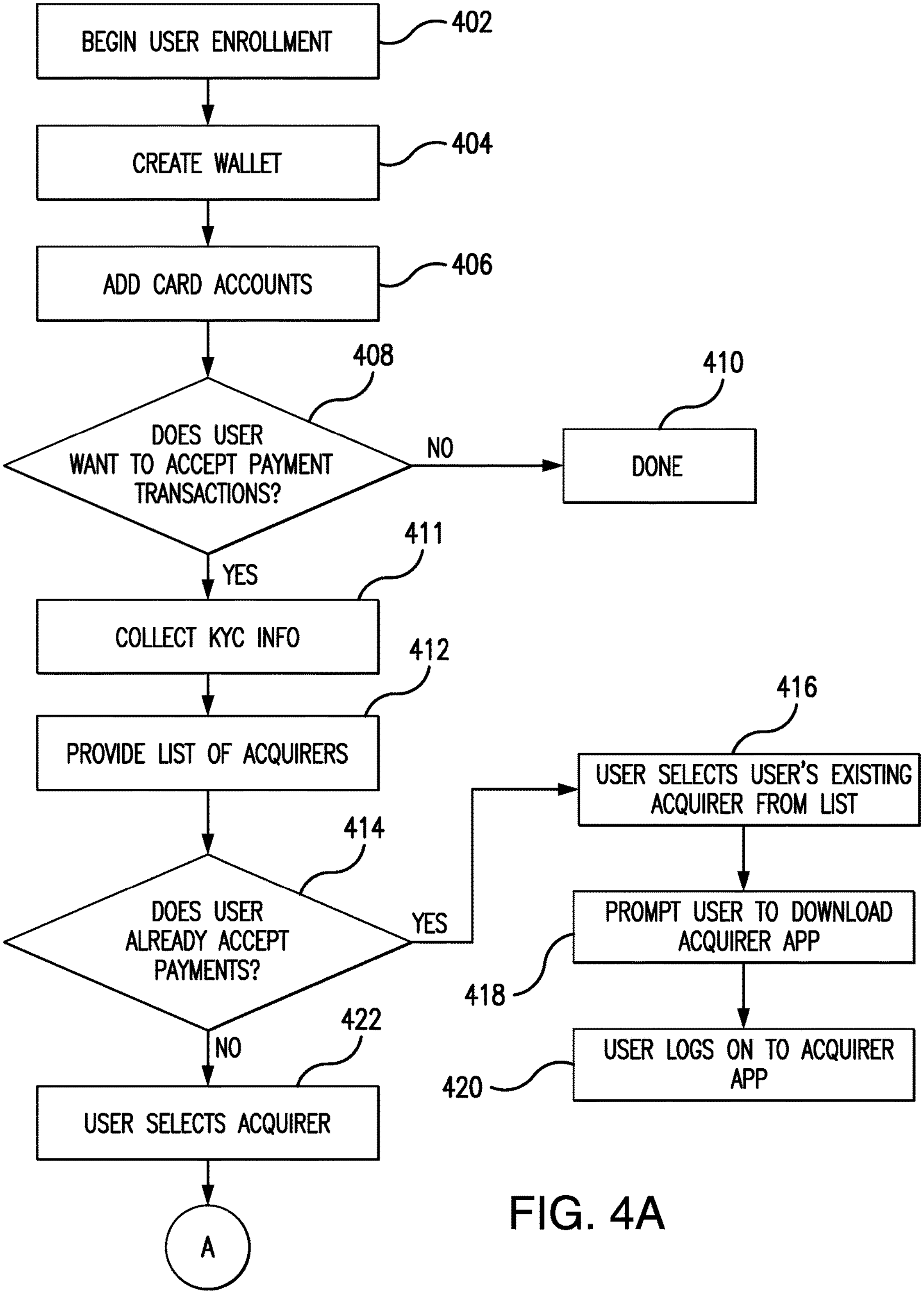
FIGS. 4A and 4B together form a flow chart that illustrates a process that may be performed according to some embodiments in the system of FIG. 2.
Figure 4B:
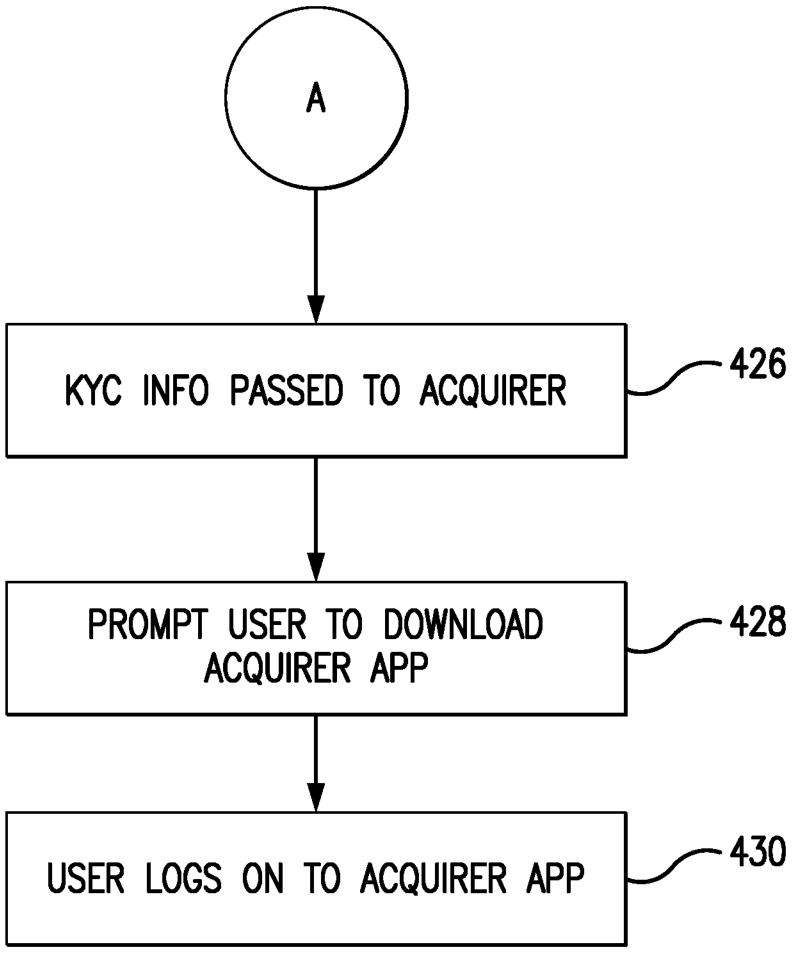

FIGS. 4A and 4B together form a flow chart that illustrates a process that may be performed in the system of FIG. 2 in accordance with aspects of the present disclosure. In particular, the process of FIGS. 4A/4B illustrates an improved manner of enrolling a user for the services provided by a WSP.

At 402 in FIG. 4A, a user (not shown) uses the user device 206 to access a website hosted by the WSP computer 202. (Alternatively, the user device 206 may access the WSP computer 202 by using a mobile app.) It is assumed at 402 that the user selects an option to allow the user to enroll to receive services from the WSP. As part of the enrollment process the user may operate the user device 206 to enter data such as the user's name, contact information, and other information typically collected about users by WSPs. Once the required information is entered, the user may request, and the WSP computer 202 may operate, to open a wallet account for the user, as indicated at 404 in FIG. 4A. The wallet account (also simply referred to as the user's wallet) may be stored in a data partition in one of the databases 320 (FIG. 3). By enrolling with the WSP, the user may also be deemed to enroll with the WSP computer 202.

Continuing to refer to FIG. 4, at 406, the user may add data to his/her wallet representing one or more of the user's payment accounts. This data may include payment account numbers such as PANs (primary account numbers) for the user's payment accounts. In some embodiments, this step may involve interaction between the user and the account issuers and/or may involve interaction between the WSP computer 202 and the account issuers.

A decision block 408 may follow block 406. At decision block 408, the WSP computer 202 may download a prompt/query to the user device 206 to ask the user whether he/she wishes to have the capability of accepting payment transactions. For example, the prompt message may be, "Would you like to accept payments?" Block 408 also assumes that the user operates the user device 206 to respond affirmatively or negatively (yes or no) to the prompt. If the user responds negatively, then block 410 follows. At block 410, the enrollment process is completed or is brought to a conclusion in a conventional manner.

If the user responds affirmatively, then block 411 follows decision block 408. At block 411, the WSP computer 202 may collect "know-your-customer" (KYC) information from the user. For example, the user may be prompted to enter details such as merchant name, merchant category, business address, Social Security number/tax ID number, and/or other information (including copies of documents) typically required for financial institutions to satisfy their KYC obligations.

Block 412 may follow block 411. At block 412, the WSP computer 202 may download a list of acquirers to the user device 206. The acquirers listed may have previously arranged with the WSP to be involved in the acceptance provisioning program embodied in the process of FIGS. 4A and 4B. Acquirers that provide a higher level of services and/or that have special relationships with the WSP may be at the top of the list of acquirers downloaded at 412.

A decision block 414 follows block 412. At decision block 414, the WSP computer 202 queries the user, via the user device 206, as to whether the user already has arrangements with an acquirer to accept payment account transactions. Again, it is assumed that the user responds affirmatively or negatively to the query. If the response is in the affirmative, then block 416 follows. At block 416, the user is presented with a list of acquirers and selects, from the list, the acquirer with which the user already has a relationship as transaction acceptor. Then, at 418, the user is prompted (by the WSP computer 202, via the user device 206) to download a transaction acceptance app (also referred to as an "acquirer app") that has been provided by the acquirer in question. At 420, the user operates the user device 206 to log on to the acquirer app. At this point, the user device 206 may be in a condition such that it is programmed and configured to effectively operate as a POS/transaction acceptance device. For example, the user device 206 may have NFC (near field communication) and/or a digital camera by which QR codes may be scanned, and may be configured to interact—via NFC—with payment-enabled mobile devices in a similar manner to the POS devices referred to above in connection with block 104 in FIG. 1. (Alternatively, the two mobile devices may communicate data to each other via QR code, with one device displaying such a code and the other scanning the displayed code to read it.)

Returning to decision block 414, if the user responds in the negative to the prompt (i.e., the user does not already accept payment account system transactions), then block 422 may follow decision block 414. At block 422, the user operates user device 206 to select an acquirer from a list provided to the user by the WSP computer 202. In doing so, it will be understood that the user is requesting to enter into a relationship with the selected acquirer in which the selected acquirer provides transaction acquiring services to the user. An indication of the user's selection of an acquirer is transmitted from the user device 206 to the WSP computer 202, and is received by the WSP computer 202.

Block 426 (FIG. 4B) may follow block 422. At block 426, the WSP computer 202 may transmit the KYC information (which was collected from and supplied by the user at block 411) to the selected acquirer, for review by the acquirer. The KYC information may be different from acquirer to acquirer; the data fields in the messaging may be dynamic to support variation in KYC information. Assuming the review by the acquirer indicates that the KYC information is satisfactory, then block 428 follows. The ensuing block 428, which is next to be discussed, assumes that the user has been asked to set a user I.D. and/or password which the user will employ to log on to the acquirer app. This information is also passed to the acquirer. In this process, there may be basic validation applied to check the availability of the user I.D., and to check that the password meets minimum criteria. At 428 the user is prompted (by the WSP computer 202, via the user device 206) to download the acquirer app that has been provided by the acquirer selected by the user at 422 (FIG. 4A). Continuing to refer to FIG. 4B, at 430, the user operates the user device 206 to log on to the acquirer app. At this point, the user device 206 may be in a condition such that it is programmed and configured to effectively operate as a POS/transaction acceptance device. For example, the user device 206 may have NFC and/or QR capabilities, and may be configured to interact—via NFC or QR—with payment-enabled mobile devices in a similar manner to the POS devices referred to above in connection with block 104 in FIG. 1.

In some embodiments, some or all of the process steps of FIGS. 4A/4B may occur during a single session in which the user device 206 accesses the WSP website.

With a process as illustrated in FIGS. 4A/4B, the sequence of events for enrolling a WSP user may be enhanced to also include provisioning of payment acceptance capabilities to the WSP user. This may include establishing a relationship between the WSP user and a transaction acquirer that will provide payment account system transaction acquiring services to the WSP user. It may be assumed that during the process of FIGS. 4A/4B the user provides card account details designating a card account to which accepted transactions are to be credited. Settlement processes following accepted transactions may be performed by the acquirer to credit the user's account, e.g., by existing channels for making transfers from bank accounts to card accounts via the payment network.

Subsequent to, or as a part of the process of FIGS. 4A/4B, the acquirer may assign a merchant identifier ("MID") to the user, with the MID linked in the acquirer's records to the user's device that will accept payment card account transactions.

In reference to block 426, it was stated that the WSP computer 202 transmitted, to the selected acquirer, KYC information collected at block 411. However, in some embodiments or situations, the WSP that operates the WSP computer 202 may have obtained some or all of the KYC information in previous dealings with the user and/or by handling and/or reviewing and/or being exposed to transactions initiated by the user.

Figure 5:
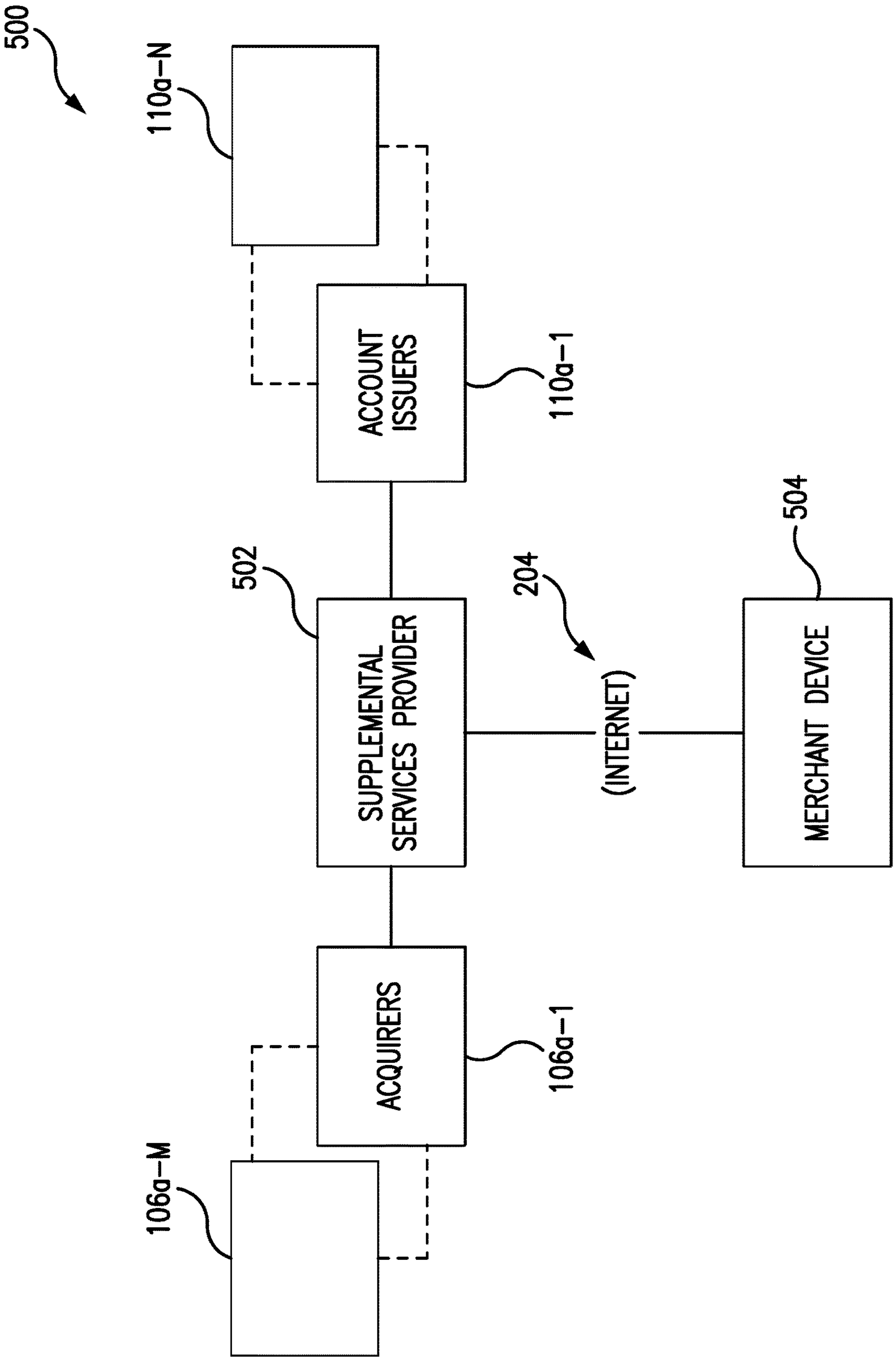
FIG. 5 is a block diagram showing aspects of another payment system according to some embodiments.

FIG. 5 is a block diagram showing aspects of payment system 500 according to some embodiments.

The system 500 includes a supplemental services provider 502. The block 502 may be implemented with a suitable server and/or mainframe computer (not separately shown). This computer may have the same sort of hardware architecture and components as were described above in connection with FIG. 3. This computer may be operated by an entity that provides payment account provision services; the entity may, for example, be affiliated with the operator of a payment network such as block 108 shown in FIG. 1. At least some of the functionality provided by the supplemental services provider 502 may be as discussed below in connection with FIG. 6. The supplemental services provider 502 is shown in data communication, via the internet 204, with a merchant device 504. The merchant device 504 may be, for example, a smartphone or other mobile computing device, or another type of computer such as a laptop computer or a desktop computer.

The supplemental services provider 502 is also in communication, at least from time to time, with one or more account issuer computers 110*a*, and with one or more acquirer computers 106*a*.

The system 500 may also include other components, which are not shown in FIG. 5, such as all of the components referred to in the above descriptions of FIGS. 1 and 2.

Figure 6:
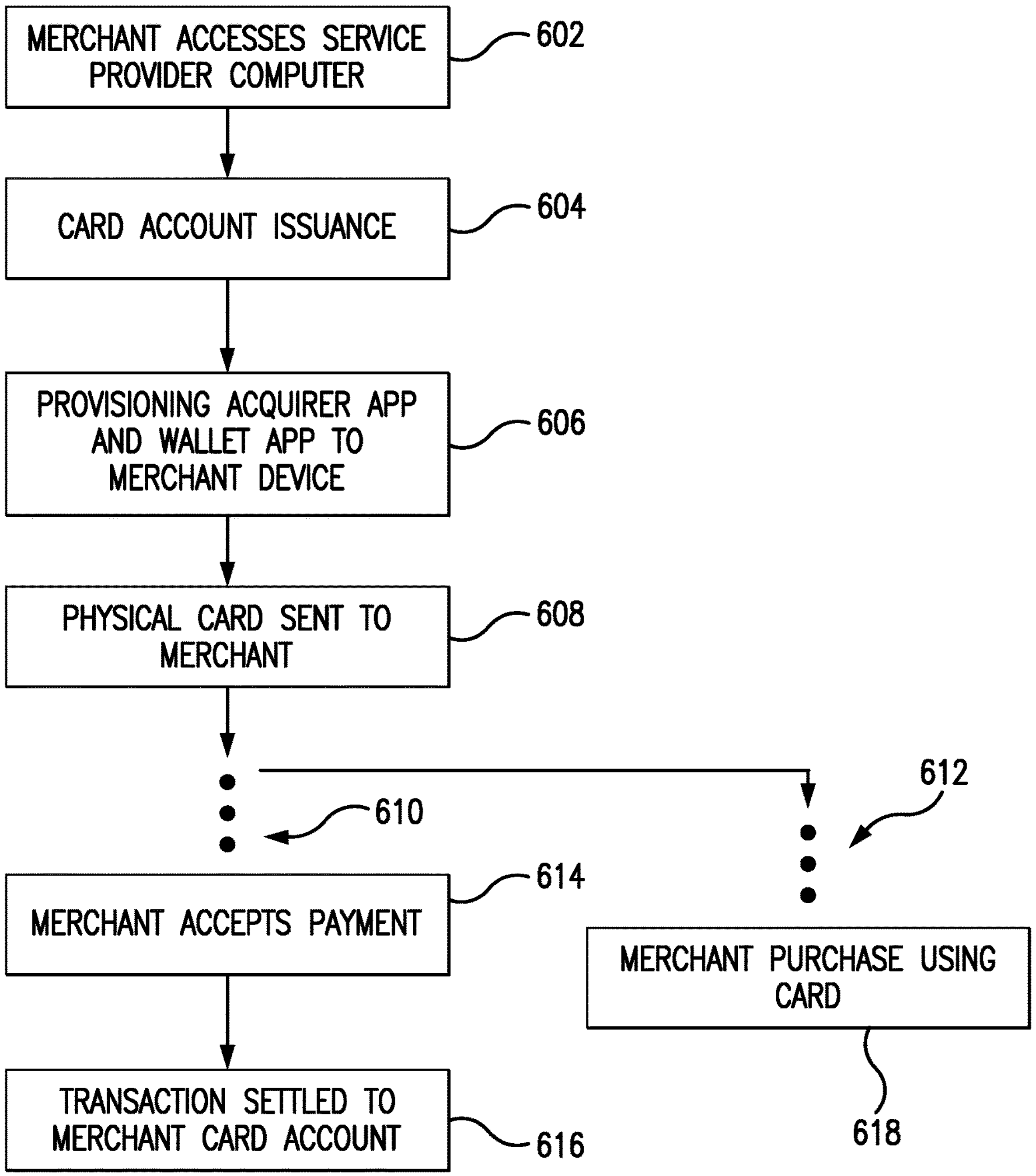
FIG. 6 is a flow chart that illustrates a process that may be performed in the system of FIG. 5.

FIG. 6 is a flow chart that illustrates a process that may be performed in the system 500 in accordance with aspects of this disclosure.

It is assumed for purposes of FIG. 6 that the merchant who operates the merchant device 504 accepts payment account system transactions and accordingly has a relationship with an acquirer 106*a* under which the acquirer provides transaction acquiring services to the merchant.

At 602 in FIG. 6, the merchant operates the merchant device 504 to access a website hosted by the computer which implements block 502. (Alternatively, the merchant device may employ a mobile app to access the computer which implements block 502.) At 604, the supplemental services provider 502 provisions a payment system account (commonly referred to as a "card account" or "payment card account") to the merchant device 504. This may involve an account issuer 110*a* (with which the supplemental services provider 502 may have a cooperative relationship) issuing the payment system account, and the supplemental services provider 502 downloading to the merchant device the account information such as account number/token, etc. The account information may be provisioned to the merchant device 504 in association with both an acquirer app and a wallet app (block 606). The supplemental services provider 502 may also arrange, per block 608, to have a physical payment card for the new payment system account sent to the merchant.

After the card issuance per blocks 602, 604, 606 and 608, further activities by the merchant may occur on later occasions (as indicated by ellipses 610 and 612). For example, at block 614, the merchant may accept a payment account system transaction. Block 616 follows. At block 616, the funds due to the merchant in respect of the transaction accepted at 614 may be settled directly into the merchant's payment card account issued at 604. If the merchant's payment card account issuing financial institution and the merchant's acquiring financial institution are not one and the same, then the settlement may involve a funds transfer from the acquiring financial institution to the account issuing financial institution.

On another occasion, as per block 618, the merchant may use the payment card provided to the merchant at 608 to implement payment for a transaction for purchase of goods by the merchant (i.e., in the transaction of block 618, the merchant acts as the purchaser, and presents the payment card to another merchant).

As used herein, the term "computer" should be understood to encompass a single computer or two or more computers in communication with each other.

As used herein, the term "processor" should be understood to encompass a single processor or two or more processors in communication with each other.

As used herein, the term "memory" should be understood to encompass a single memory or storage device or two or more memories or storage devices.

As used herein, a "server" includes a computer device or system that responds to numerous requests for service from other devices.

The above descriptions and illustrations of processes herein should not be considered to imply a fixed order for performing the process steps. Rather, the process steps may be performed in any order that is practicable, including simultaneous performance of at least some steps and/or omission of some steps.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" and "payment account" are used interchangeably herein. The term "payment card account number" includes a number that identifies a payment card system account or a number carried by a payment card, or a number that is used to route a transaction in a payment system that handles payment card transactions. The term "payment card" includes a credit card, debit card, prepaid card, or other type of payment instrument, whether an actual physical card, electronic, or virtual.

As used herein and in the appended claims, the term "payment card system" or "payment account system" refers to a system for handling purchase transactions and related transactions. An example of such a system is the one operated by Mastercard International Incorporated, the assignee of the present disclosure. In some embodiments, the term "payment card system" may be limited to systems in which member financial institutions issue payment card accounts to individuals, businesses and/or other organizations.

Although the present invention has been described in connection with specific example embodiments, it should be understood that various changes, substitutions, and alterations apparent to those skilled in the art can be made to the disclosed embodiments without departing from the spirit and scope of the appended claims.

What is claimed is:

1. A method comprising:

collecting know-your-customer information from a first merchant;

creating a relationship with an acquirer financial institution using the collected know-your-customer information, wherein the acquirer financial institution provides a transaction acceptance program to the first merchant and the first merchant receives transaction acquiring services from the acquirer financial institution including acceptance of payment account system transactions via the transaction acceptance program of acquirer financial institution;

downloading from the acquirer financial institution in response to creation of the relationship, to a first merchant mobile device operated by the first merchant:

the transaction acceptance program provided by the acquirer financial institution, and a payment application program, wherein the payment application program enables the device to operate as a payment-enabled device;

maintaining a payment card account for the first merchant, the payment card account having a balance amount, and the payment card account associated with both the transaction acceptance program and the payment application program;

accessing the transaction acceptance program with the first merchant mobile device, wherein the transaction acceptance program enables the first merchant mobile device of the first merchant to operate as a point of sale transaction acceptance device and accept payment transactions from other devices, and the first merchant mobile device is linked to a merchant identifier by the acquirer financial institution;

detecting, by the first merchant mobile device, a Quick Response (QR) code or Near Field Communication (NFC) provided by a second device to initiate a transaction;

operating the first merchant mobile device as the point of sale transaction acceptance device in response to reading payment card account data from the second device via the QR code or NFC;

generating, by the transaction acceptance program, transaction data based on the reading;

transmitting a payment account system authorization request for the transaction to the acquirer financial institution, the request including the generated transaction data;

designating, via the first merchant mobile device, the payment card account to receive credited settlements;

receiving, per execution of the transaction acceptance program using the read payment card account data, settlements of payment card account transactions accepted by the first merchant, said settlements credited to said balance amount of said designated payment card account maintained for the first merchant; and operating the first merchant mobile device as a payment-enabled device in response to employment of the payment application program.

2. The method of claim 1, wherein said payment card account was issued by an account issuer, said account issuer receiving said settlements.

3. The method of claim 1, wherein said payment card account was issued by an account issuer, said settlements received by a financial institution other than said account issuer, said received settlements transferred by said financial institution to said account issuer.

4. The method of claim 1, further comprising:

issuing a physical payment card to the first merchant, the card for accessing the payment card account.

5. The method of claim 1, further comprising:

assigning a merchant identifier to the payment card account.

6. The method of claim 5, wherein executing the payment application program further comprises:

debiting the balance amount of the payment card account maintained for the merchant.

7. The method of claim 6, wherein the debiting is in response to a merchant-initiated transaction.

8. The method of claim 1, wherein settlements are received in response to executing a transaction with a payment enabled device.

9. The method of claim 1, further comprising:

receiving a designation of the payment card account to settle payment card account transactions.

10. The method of claim 1, wherein the payment card account data is in a form of a token.

* * * * *